United States Patent
Okada et al.

(10) Patent No.: US 7,068,467 B2
(45) Date of Patent: *Jun. 27, 2006

(54) THIN FILM MAGNETIC HEAD AND MAGNETIC DISK APPARATUS INCLUDING THE SAME

(75) Inventors: Tomohiro Okada, Hitachi (JP); Tetsuya Okai, Odawara (JP); Shinobu Sasaki, Odawara (JP); Tadayuki Iwakura, Odawara (JP); Naoki Koyama, Nakano-ku (JP); Harunobu Saito, Chigasaki (JP); Makoto Morijiri, Naka-gun (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/933,451

(22) Filed: Sep. 3, 2004

(65) Prior Publication Data
US 2005/0024767 A1   Feb. 3, 2005

Related U.S. Application Data

(60) Continuation of application No. 09/964,737, filed on Sep. 28, 2001, now Pat. No. 6,877,212, which is a division of application No. 09/354,467, filed on Jul. 15, 1999, now Pat. No. 6,483,663.

(30) Foreign Application Priority Data

Jul. 23, 1998 (JP) ................................ 10-207491

(51) Int. Cl.
*G11B 5/147* (2006.01)
(52) U.S. Cl. ..................... 360/126; 360/317
(58) Field of Classification Search ................ 360/125, 360/126, 317
See application file for complete search history.

(56) References Cited

U.S. PATENT DOCUMENTS

| | | | |
|---|---|---|---|
| 4,966,648 A | 10/1990 | Nakamura et al. | 216/22 |
| 5,567,333 A | 10/1996 | Hira et al. | 216/22 |
| 5,691,867 A | 11/1997 | Onuma et al. | 360/126 |
| 5,805,391 A * | 9/1998 | Chang et al. | 360/317 |
| 5,828,533 A | 10/1998 | Ohashi et al. | 360/126 |
| 5,872,693 A | 2/1999 | Yoda et al. | |
| 5,901,431 A | 5/1999 | Santini | 29/603.14 |
| 6,018,862 A | 2/2000 | Stageberg et al. | 29/603.14 |
| 6,033,580 A * | 3/2000 | Shouji et al. | 216/22 |
| 6,034,847 A | 3/2000 | Komuro et al. | 360/126 |
| 6,091,582 A | 7/2000 | Komuro et al. | 360/126 |

(Continued)

FOREIGN PATENT DOCUMENTS

| | | |
|---|---|---|
| JP | 55-118333 | 8/1980 |
| JP | 61020212 | 1/1986 |
| JP | 5046934 | 2/1993 |

(Continued)

*Primary Examiner*—Allen Cao
(74) *Attorney, Agent, or Firm*—Kenyon & Kenyon LLP

(57) ABSTRACT

Disclosed is a magnetic disk apparatus including a magnetic reproducing head portion, and a magnetic recording head including an upper magnetic core having a end portion and a rear portion. As a resist for a frame which is used for forming the rear portion, a negative resist or an electron beam resist is used, whereby the frame is formed without any adverse effect of halation from a coil insulating film. That is, it is possible to manufacture a magnetic recording head in which the rear portion of an upper magnetic core is not emerged at the face opposed to a medium, and hence to obtain a magnetic disk apparatus exhibiting an areal recording density of 5 Gbit/in$^2$ or more by mounting a magnetic recording/reproducing head including such a magnetic recording head.

25 Claims, 4 Drawing Sheets

U.S. PATENT DOCUMENTS

| | | | |
|---|---|---|---|
| 6,483,663 B1* | 11/2002 | Okada et al. | 360/126 |
| 6,530,141 B1* | 3/2003 | Komuro et al. | 29/603.14 |
| 6,597,543 B1* | 7/2003 | Toba et al. | 360/317 |
| 6,668,442 B1* | 12/2003 | Sasaki | 29/603.14 |
| 6,877,212 B1* | 4/2005 | Okada et al. | 29/603.07 |
| 6,952,866 B1* | 10/2005 | Yoshida et al. | 29/603.13 |
| 2002/0113036 A1* | 8/2002 | Sasaki | 216/66 |
| 2003/0128480 A1* | 7/2003 | Saitho et al. | 360/317 |

FOREIGN PATENT DOCUMENTS

| | | |
|---|---|---|
| JP | 06-020227 | 1/1994 |
| JP | A 7-141621 | 6/1995 |
| JP | 07-296328 | 11/1995 |
| JP | A 9-270105 | 10/1997 |
| JP | 10-105921 | 4/1998 |

* cited by examiner

THIN FILM MAGNETIC HEAD AND MAGNETIC DISK APPARATUS INCLUDING THE SAME

This is a continuation of application Ser. No. 09/964,737 filed 28 Sep. 2001, now U.S. Pat. No. 6,877,212, which is a division of application Ser. No. 09/354,467 filed 15 Jul. 1999, now U.S. Pat. No. 6,483,663.

BACKGROUND OF THE INVENTION

1. Field of the Invention

The present invention relates to a thin film magnetic recording/reproducing head used for a magnetic disk apparatus, and a magnetic disk apparatus or recording/reproducing apparatus including the same.

2. Description of the Related Art

In a magnetic disk apparatus, data are written or read on or from a recording medium or magnetic disk by a magnetic head. To increase a recording capacity per unit area of a magnetic disk, an areal recording density is required to be enhanced. The areal recording density can be enhanced by increasing a track density and a linear recording density. To increase the track density of the above two factors for enhancing the areal recording density, the track width of the magnetic head is required to be made fine and precise. As the track width becomes narrower, a reproducing output becomes smaller, and therefore, to attain a narrower track width, a reproducing head is required to be changed from a MR (Magneto-resistive) head having been extensively available at present to a GMR (Giant Magneto-resistive) head.

To form a magnetic core, including a track portion, of a recording head, a process using dry etching such as ion milling or a process using frame plating has been widely used.

A process of forming an upper magnetic core by using dry etching such as ion milling is performed by forming a magnetic film made from permalloy or the like by sputtering; forming a resist pattern on the magnetic film by photo-lithography; and selectively removing the magnetic film by dry etching such as ion milling by use of the resist pattern as a mask.

On the other hand, the process of forming an upper magnetic core by frame plating is performed by forming an undercoat for plating on a substrate; forming a resist frame on the substrate by photo-lithography; plating the substrate, on which the frame has been formed, with a magnetic material such as permalloy to form a magnetic film; masking a region surrounded with the frame with a resist by photo-lithography; and removing an unnecessary portion of the magnetic film by wet etching.

To increase the recording density of a magnetic disk apparatus, as described above, the track width of a magnetic head is required to be made fine and precise. On the other hand, to avoid magnetic saturation at a track portion located at the end of an upper magnetic core of a magnetic head, the thickness of the upper magnetic core is required to be made as large as being in a range of 2 μm to several μm. The upper magnetic core having such a large thickness, however, cannot be accurately formed by the process using dry etching such as ion milling. This is because a variation in dimension of a resist pattern formed by photo-lithography is added to a variation in dimension of a magnetic film caused upon dry etching of the magnetic film using the resist pattern as a mask. On the contrary, the above magnetic core having the large thickness can be accurately formed by the process using frame plating. This is because a variation in dimension of a resist frame becomes a variation in dimension of the magnetic film for forming the upper magnetic core as it is. Accordingly the process using frame plating is superior in dimensional accuracy to the process using dry etching such as ion milling.

Since the thickness of a resist used as a resist frame must be larger than a plating thickness, it is required to be significantly larger than a film thickness used for fabrication of a semiconductor device, that is, about 1 μm, more concretely, in a range of at least 2–3 μm to 10 μm. In a mirror projection aligner or a stepper as an exposure system, the resolution (R) of the resist pattern is expressed by $$R = k_1 \cdot \lambda / NA$$

where $k_1$ is a constant, NA is the numerical aperture of a lens, and $\lambda$ is a wavelength of exposure light. Also the depth of focus (DOF) of the above exposure system is expressed by $$DOF = k_2 \cdot \lambda / NA^2$$

where $k_2$ is a constant.

As is apparent from these equations, to increase the resolution, the wavelength of exposure light may be shortened and the numerical aperture of the lens be increased; however, in this case, the depth of focus becomes shallower. Consequently, to make fine the resist pattern, it is required to make thin the thickness of the resist as well as shorten the wavelength of exposure light and increase the numerical aperture of the lens. Alternatively, to obtain a necessary depth of focus with the resolution fixed, it is required to shorten the wavelength of exposure light and reduce the numerical aperture of the lens. In the case of using a widely available high pressure mercury lamp as a light source, if exposure is performed using g-line (wavelength: 436 nm), resolution up to 2.0 μm can be attained for the resist having a thickness of 8 μm; and if exposure is performed using i-line (wavelength: 365 nm), resolution up to 1.3 μm can be attained for the resist having the thickness of 8 μm. In the case of using i-line for exposure, resolution up to 0.5 μm can be attained by thinning the resist to 1 μm or less. The resist having a thickness of 1 μm or less, however, is too thin to be used for a resist frame, and therefore, such a resist cannot be used for formation of a magnetic core.

Japanese Patent Laid-open No. Hei 7-296328 discloses a method of defining a track width of a recording head by forming a resist layer having a thickness ranging from 0.7 to 0.8 μm on a $SiO_2$ (silicon dioxide) film, forming a notch structure by selectively etching the $SiO_2$ film using the resist-layer as a mask, and forming a magnetic film in the notch structure. The method disclosed in this document, however, is poor in dimensional accuracy because etching is performed using the resist pattern as a mask. That is to say, a variation in dimension of the resist pattern is added to a variation in dimension of the notch structure formed by etching. Another problem of this method is that a magnetic pole end of an upper magnetic pole layer is emerged at the face, opposed to a medium, of a magnetic core, and accordingly a magnetic flux leaked from the magnetic pole end of the upper magnetic pole layer may write or erase signals, to thereby enlarge an effective track width.

To solve the above problem, it may be considered to form the upper magnetic pole layer by frame plating in such a manner as to prevent the magnetic pole end of the upper magnetic pole layer from being emerged at the face, opposed to a medium, of the magnetic core; however, in this case, there arises a problem that it is difficult to accurately form a frame for plating because of halation from a coil insulating film as shown in FIG. 1. FIG. 1. shows that a positive-type photo-resist layer 3 is exposed by reflected light from a insulating film 2 on a predetermined substrate 10. In FIG. 1., numeral 1 designates a conductive coil. This reflection light causes the above-said halation of the positive-type resist layer.

To cope with such an inconvenience, Japanese Patent Laid-open No. Hei 6-20227 discloses a method of forming a frame for a rear portion of a magnetic core using a negative resist.

In the invention disclosed in Japanese Patent Laid-open No. Hei 6-20227, however, since a end portion of the magnetic core is formed after formation of a stepped portion of the coil insulating film, the thickness of the resist becomes large at the stepped portion of the coil insulating film, and thereby it is difficult to form the resist pattern of about 1.5 µm. Also when the track width is made as narrow as about 1.5 µm, magnetic saturation occurs at the narrow portion, to cause a problem that it is difficult for a magnetic field to be emerged to the face, opposed to a medium, of the magnetic core. Further, to enhance the data transfer speed of a magnetic disk apparatus, it is required to improve characteristics of a recording head at a high frequency, and to meet such a requirement, it is necessary to most suitably select a material used for the upper magnetic core, more concretely, such that the magnetic domain is directed in the track width direction and the resistivity is increased to reduce an eddy current loss. On the other hand, to avoid occurrence of magnetic saturation at the end portion of the magnetic core as described above, it is required to use a material having a high magnetic saturation density. Eventually, it is difficult to select a material capable of satisfying these requirements.

For this reason, conventionally, there have been not manufactured yet a recording/reproduction separation type thin film magnetic head having a narrow track width of 1.5 µm or less or capable of keeping up with data transfer at a high speed, and a magnetic disk apparatus including such a thin film magnetic head and exhibiting an areal recording density of 5 Gbit/in$^2$ or more.

SUMMARY OF THE INVENTION

An object of the present invention is to provide a magnetic disk apparatus exhibiting an areal recording density of 5 Gbit/in$^2$ or more by using a recording/reproduction separation type thin film magnetic head having a narrow track width of 1 µm or less or capable of keeping up with data transfer at a high speed.

To achieve the above object, according to the present invention, there is provided a magnetic recording/reproducing apparatus exhibiting an areal recording density of 5 Gbit/in$^2$ or more, on which a magnetic recording/reproducing head portion is mounted, said magnetic recording/reproducing head comprising: a reproducing head portion using a giant magneto-resistive film; and a thin film magnetic recording head including an upper magnetic core having a end portion and a rear portion, wherein the front end of a connection area in which said end portion is connected to said rear portion is located between the face, opposed to a medium, of said upper magnetic core and a position, defining a gap depth, of said upper magnetic core.

To achieve the above object, according to the present invention, furthermore, there is provided a magnetic disk apparatus exhibiting an areal recording density of 5 Gbit/in$^2$ or more, including a reproducing head portion configured as a GMR head; and a thin film magnetic recording head having an upper magnetic core 21 including a end portion and a rear portion; wherein the upper magnetic core is specified such that the track width is 1.5 µm or less; the end portion projects from the rear portion toward the face opposed to a medium; and the front end of a connection area in which the end portion is connected to the rear portion is located between the face opposed to the medium and a position defining a gap depth.

According to the present invention, there is also provided a magnetic disk apparatus exhibiting a transfer speed of 50 MHz or more, including a reproducing head configured as a MR head or a GMR head; and a thin film magnetic recording head having an upper magnetic core including a end portion and a rear portion; wherein the upper magnetic core is specified such that the front end of a connection area in which the end portion is connected to the rear portion is located between the face opposed to the medium and a position defining a gap depth.

In the above thin film magnetic recording head, the rear portion of the upper magnetic core may be formed by frame plating and a frame used for frame plating may be formed of a negative resist or an electron beam resist.

The end portion of the upper magnetic core may be formed of a magnetic film having a saturation magnetic induction flux density (Bs) of 1.5 T or more. The saturation magnetic induction flux density of the rear portion may be different from that of the end portion.

The upper magnetic core is preferably produced by forming the end portion, covering the end portion with a non-magnetic protective film, and removing the non-magnetic protective film from above until the upper magnetic core is exposed, to magnetically connect the end portion to the rear portion. The removal of the non-magnetic protective film may be performed by polishing or etch-back using dry etching.

The above etch-back using dry etching may be performed by using one or more kinds of gases selected from a group of $CF_4$, $C_4H_8$, $CHF_3$, $BCl_3$, $Cl_2$, $SiCl_4$, Ne, Ar, Kr, and Xe.

DETAILED DESCRIPTION

Figure 1:
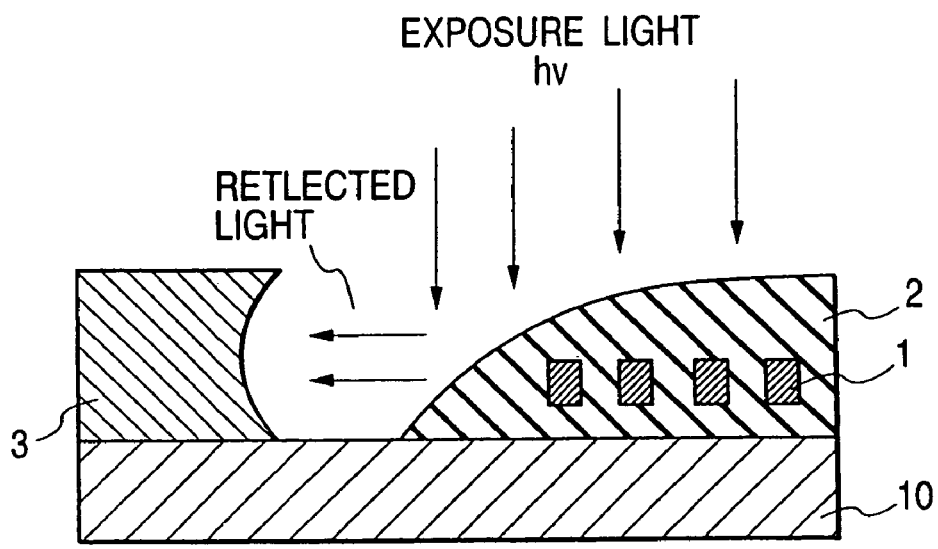
FIG. 1 is a schematic view, on an arbitrarily enlarged scale, showing a state in which halation occurs upon formation of a frame using a positive resist.

To increase the recording density of a magnetic disk apparatus, as described above, it is required to attain a narrow track width of a magnetic head, and to satisfy such a requirement, it is necessary to form a fine resist pattern. To form a fine resist pattern, the wavelength of light for exposure of the resist has been shortened. For example, the exposure light has been changed from g-line (wavelength: 436 nm) to i-line (wavelength: 365 nm) of the mercury lamp, and further changed to KrF excimer laser (wavelength: 248 nm). As described above, to ensure a desired depth of focus with a specific resolution, it is necessary to shorten the wavelength of light for exposure and to reduce the numerical aperture (NA); however, it is difficult to form a pattern of 0.5 μm required for formation of an upper magnetic core having a narrow track width by using a resist having a thickness of 3 μm or more. To cope with such an inconvenience, it may be considered to produce the upper magnetic core by previously forming only a end portion of the upper magnetic core and subsequently forming a rear portion thereof; however, in this case, if the rear portion is emerged at the face, opposed to a medium, of the upper magnetic core, there occurs a problem that a magnetic field leaked from the emerged portion may write or erase signals. And, in the case of forming the rear portion of the upper magnetic core by frame plating in such a manner as to prevent the rear portion from being emerged at the face opposed to a medium, there arises a problem that it is difficult to accurately form a frame for plating because of halation from a coil insulating film. FIG. 1 schematically shows the state in which halation occurs upon formation of a frame using a positive resist.

Figure 2:
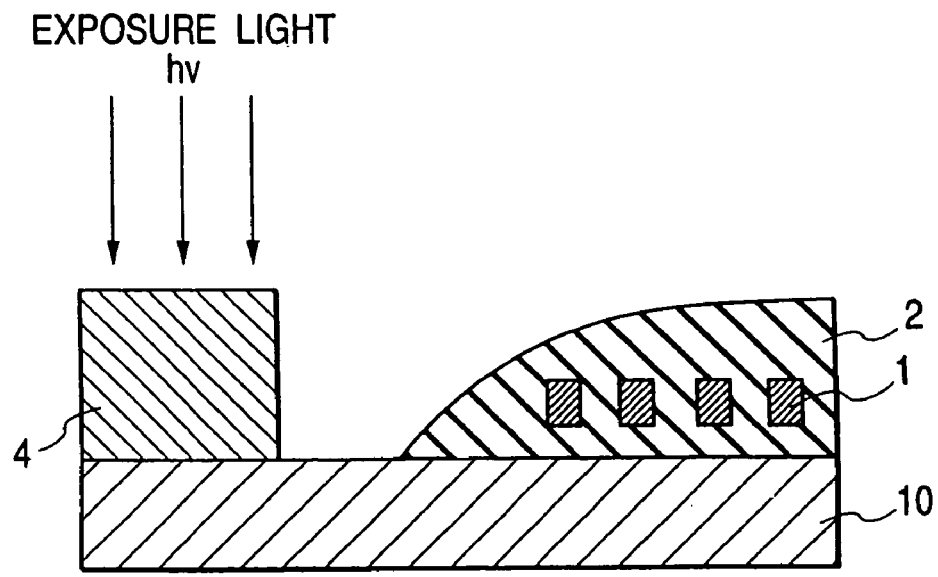
FIG. 2 is a schematic view, on an arbitrarily enlarged scale, showing a state in which halation occurs upon formation of a frame using a negative resist.

It has been found that the problem associated with halation can be solved by using a negative resist or an electron beam resist for forming a frame used for forming the rear portion of the upper magnetic core. For the negative resist, a resist pattern irradiated with light remains. Accordingly, in the case of forming a frame by using the negative resist, a portion to be taken as a frame is irradiated with light, and thereby the light reflected from a tilted surface portion of the coil insulating film is not impinged on the portion to be taken as the frame, with a result that there does not occur the problem that the frame is hollowed as shown in FIG. 1. Such a state in which the frame is formed by using the negative type resist 4 is schematically shown in FIG. 2. In FIG. 2., numerals 1, 2, and 10 show the same parts respectively as in FIG. 1. As the above negative resist, there may be used a resist sold, for example, by Tokyo Ohka Kogyou Co., Ltd. under the trade name of TSMR-iN010. In the case of using the electron beam resist, since the migration distance of electrons reflected from the tilted surface portion of the coil insulating film is short, even if the electron beam resist is of a positive type, there does not occur the above problem associated with constriction of the frame, and if it is of a negative type, the frame can be of course formed with no problem for the above-described reason. As the electron beam resist, there may be used a resist sold, for example, by Shipley Far East Ltd. under the trade name of SAL601.

The end portion of the upper magnetic core may be formed by the related art frame plating process. In this case, since exposure is made in a state with no stepped portion of the coil insulating film, the frame corresponding to the track width of 1 μm or less can be formed with no problem of halation.

Further, when the track width is made as narrow as about 1 μm, since magnetic saturation occurs at the end portion, a magnetic field is less emerged to the face opposed to a medium. To solve such a problem, it may be desirable to enlarge the cross-section of the rear portion of the upper magnetic core; and to make a connection area in which the end portion is connected to the rear portion closer to the face opposed to a medium, more concretely, to locate the front end of the connection area between the face opposed to the medium and a position defining a gap depth.

A protective film used for covering the end portion of the upper magnetic core once may be formed from $Al_2O_3$ or $SiO_2$ by usual sputtering. Further, to expose the surface of the end portion for magnetically connecting the end portion to the rear portion of the upper magnetic core, the protective film may be removed by polishing, such as, CMP (Chemical Mechanical Polishing) or by forming a resist film on the protective film, flattening the resist film by baking, and etch-back the resist and the protective film at an equal rate by ion milling or RIE (Reactive Ion Etching). The etch-back may be performed by using one or more kinds selected from $CF_4$, $C_4F_8$, $CHF_3$, $BCl_3$, $Cl_2$, $SiCl_4$, Ne, Ar, Kr, and Xe. For example, in the case of-etch-back the protective film made from $Al_2O_3$, there may be used a mixed gas of $CHF_3$ and Ar or $BCl_3$, and in the case of etch-back the protective film made from $SiO_2$, there may be used $CF_4$. As an etching system, a system including a high density plasma source, which is capable of realizing high rate etching and improving the throughput, is superior to a usual parallel plate RIE system. For example, an ECR (Electron Cyclotron Resonance), ICP (Inductively Coupled Plasma), or helicon wave plasma type system may be used as the etching system having a high density plasma source. Either of these systems can realize high rate etching being about 10 times that of the usual parallel plate RIE system.

As a giant magneto-resistive film, there has been known, for example, a multi-layered film type using a multi-layer film such as Fe/Cr; a spin-valve type in which a non-magnetic film made from Cu or the like is held between magnetic films made from Co or NiFe and magnetization of one of the upper and lower magnetic films is fixed by an anti-ferromagnetic film made from FeMn or the like; or a tunneling magneto-resistive type in which an insulating non-magnetic film made from $Al_2O_3$ or the like is held between magnetic films made from Co or NiFe and magnetization of one of the upper and lower magnetic films is fixed by an anti-ferromagnetic film made from FeMn or the like. In the reproducing head using such a giant magneto-resistive film, the track width is made narrow by making narrow a gap between electrodes disposed on the giant magneto-resistive film. At present, the gap between the electrodes is formed by a lift-off process; however, the track width obtained by lift-off is limited to 0.7 μm, and to obtain the track width narrower than 0.7 μm, the track width must be formed by RIE. In addition, the electrode is made from a high melting point metal such as Ta or W.

To form a magnetic core, including a track portion, of a recording head, a process using dry etching such as ion milling or a process using frame plating has been widely used.

A process of forming an upper magnetic core by using dry etching such as ion milling is performed by forming a magnetic film made from permalloy or the like by sputtering; forming a resist pattern on the magnetic film by photo-lithography; and selectively removing the magnetic, film by dry etching such as ion milling by use of the resist pattern as a mask.

On the other hand, the process of forming an upper magnetic core by frame plating is performed by forming an undercoat for plating on a substrate; forming a resist frame on the substrate by photo-lithography; plating the substrate, on which the frame has been formed, with a magnetic material such as permalloy to form a magnetic film; masking a region surrounded with the frame with a resist by photo-lithography; and removing an unnecessary portion of the magnetic film by wet etching.

To increase the recording density of a magnetic disk apparatus, as described above, the track width of a magnetic head is required to be made fine and precise. On the other hand, to avoid magnetic saturation at a track portion located at the end of an upper magnetic core of a magnetic head, the thickness of the upper magnetic core is required to be made as large as being in a range of 2 µm to several µm. However, as the track width becomes narrower, a reproducing output becomes smaller, and therefore, to attain a narrower track width, a reproducing head is required to be changed from a MR (Magneto-resistive) head having been extensively available at present to a GMR (Giant Magneto-resistive) head. As a giant magneto-resistive film, there has been known, for example, a multi-layered film type using a multi-layer film such as Fe/Cr; a spin-valve type in which a non-magnetic film made from Cu or the like is held between magnetic films made from Co or NiFe and magnetization of one of the upper and lower magnetic films is fixed by an anti-ferromagnetic film made from FeMn or the like; or a tunneling magneto-resistive type in which an insulating non-magnetic film made from $Al_2O_3$ or the like is held between magnetic films made from Co or NiFe and magnetization of one of the upper and lower magnetic films is fixed by an anti-ferromagnetic film made from FeMn or the like. In the reproducing head using such a giant magneto-resistive film, the track width is made narrow by making narrow a gap between electrodes disposed on the giant magneto-resistive film. At present, the gap between the electrodes is formed by a lift-off process; however, the track width obtained by lift-off is limited to 0.7 µm, and to obtain the track width narrower than 0.7 µm, the track width must be formed by RIE. In addition, the electrode is made from a high melting point metal such as Ta or W.

Figure 3:
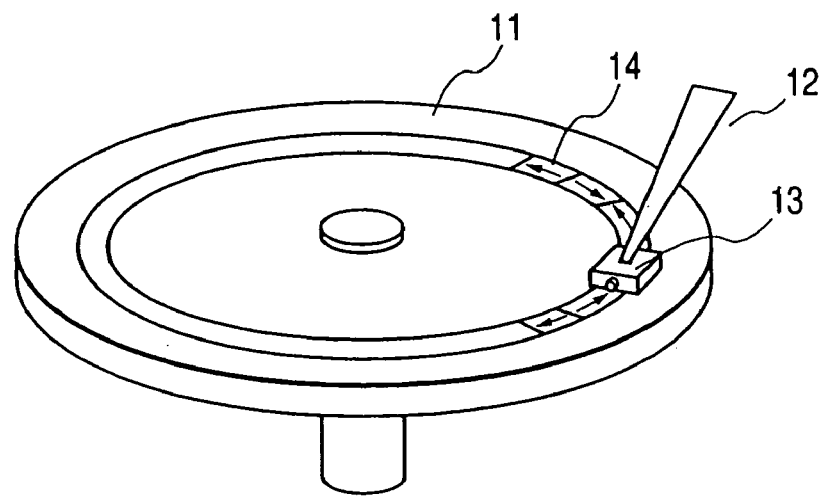
FIG. 3 is a schematic view, on an arbitrarily enlarged scale, showing the conception of a magnetic disk apparatus.
Figure 7:
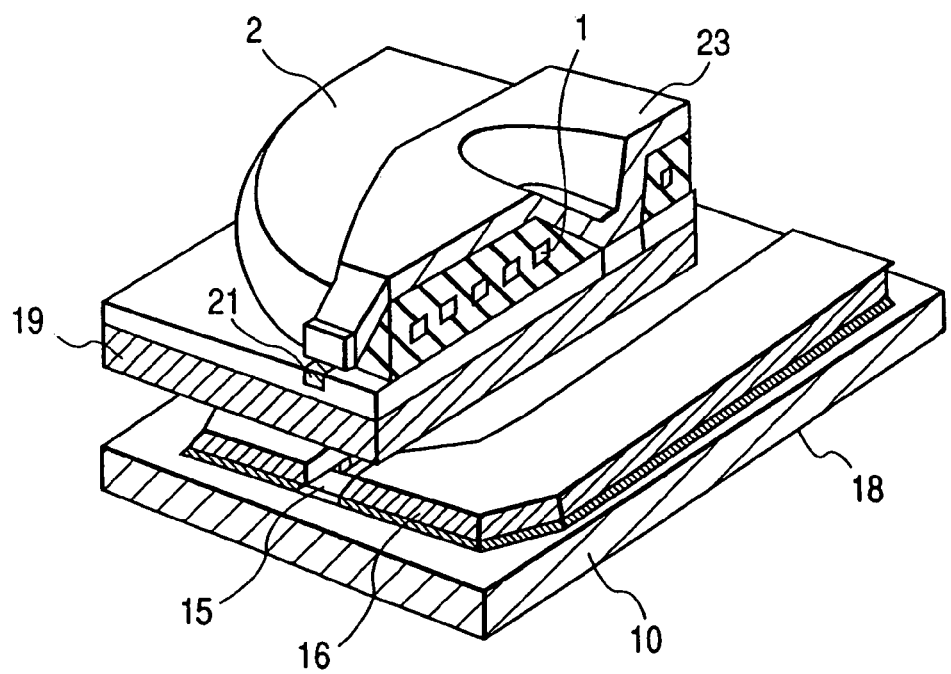
FIG. 7 is a schematic sectional view, on an arbitrarily scale, of the magnetic head according to the embodiment of the present invention.

Hereinafter, the present invention will be more fully described with reference to the drawings. FIG. 3 is a schematic view, on an arbitrarily enlarged scale, showing the conception of a magnetic disk apparatus according to one embodiment of the present invention. In the magnetic disk apparatus, signals 14 are recorded or reproduced on or from a magnetic disk 11 by a magnetic head 13 fixed at the end of a support 12. FIG. 7 schematically shows a recording/reproduction separation type magnetic head having a structure in which a recording head is stacked on a reproducing head using a giant magneto-resistive effective film 15. In FIG. 7., numeral 1 designates a coil, 2 an insulator, 15 a GMR film, 16 lead, 21 an end portion of a magnetic core(upper), 23 a rear portion of a magnetic core(upper), 10 substrate(and shield(lower) 18), and 19 shield(upper).

Figure 4:
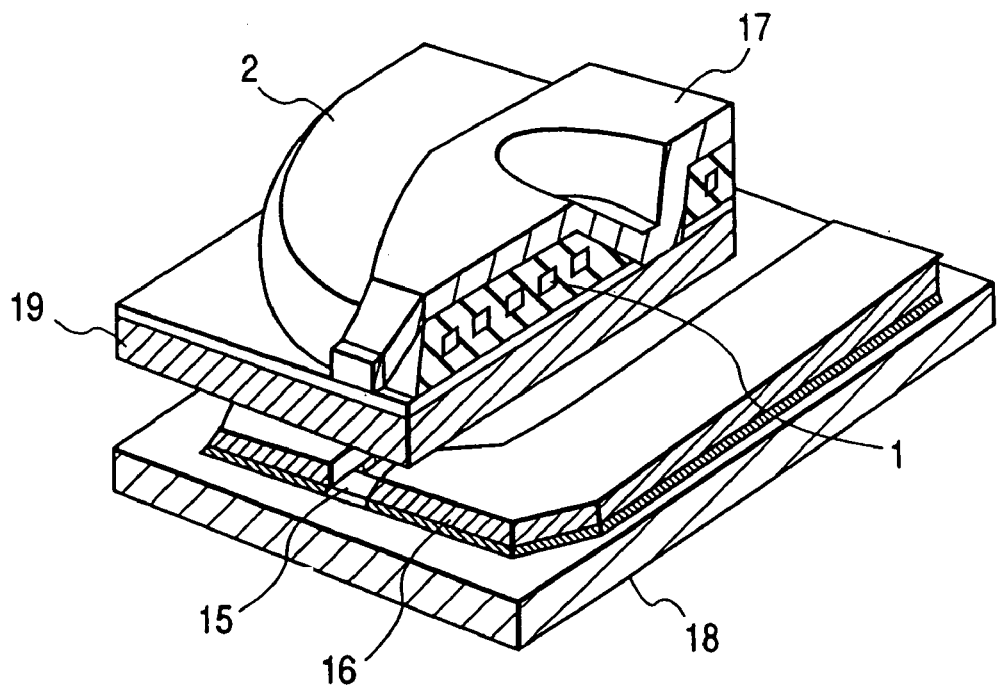
FIG. 4 is a schematic view, on an arbitrarily enlarged scale, showing a related art magnetic disk apparatus.

FIG. 4 schematically shows a conventional recording/reproduction separation type magnetic head having a structure in which a recording head is stacked on a reproducing head using a giant magneto-resistive effective film 15 as compared with the example of the present invention shown in FIG. 7. In FIG. 4., numeral 1 designates a coil, 2 an insulator, 15 GMR film, 16 electrode, 17 a magnetic core (upper), 18 substrate, and 19 shield(upper).

Figure 5A:
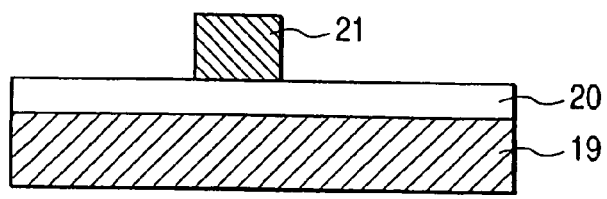
FIGS. 5(a) to 5(d) are schematic sectional views, on an arbitrarily scale, illustrating sequential steps of manufacturing a magnetic head according to one embodiment of the present invention.

The process of manufacturing such a magnetic head will be described below. FIGS. 5(a) to 5(d) show steps of forming a end portion of an upper magnetic core, forming a protective film to cover the end portion, and etch-back the protective film. After a reproducing head having a shield serving as a lower magnetic core of a recording head was formed, a gap film for the recording head was formed and then a frame for forming a end portion 21 of an upper magnetic core was formed. A film of CoNiFe having a saturation magnetic induction flux density (Bs) of 1.6 T was formed by plating using the frame, to form the end portion 21. Such a state is shown in FIG. 5(a). It should be noted that the reproducing head portion is omitted in FIG. 5(a).

In FIGS. 5(a) to 5(d), numeral 19 designates a shield (upper), 20 a magnetic gap(that is a gap layer), 21 an end portion of an upper magnetic core, 22 a protective layer, and 23 a rear portion of a magnetic core(upper).

Figure 5B:
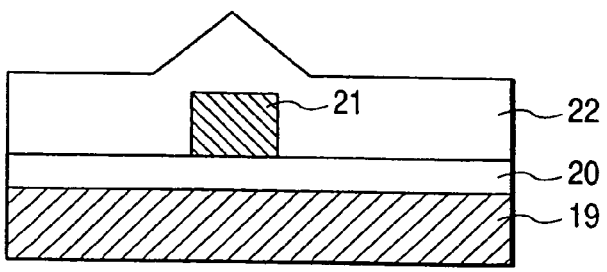
Figure 5C:
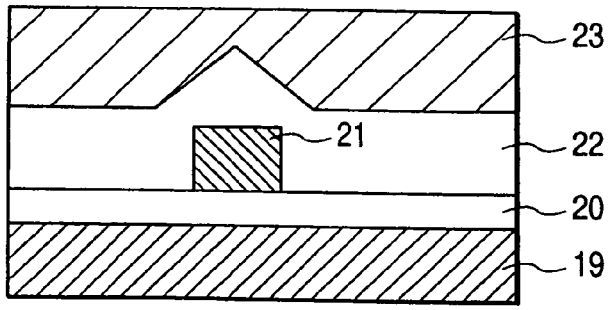
Figure 5D:
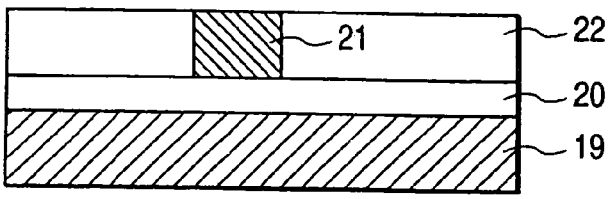

A protective film 22 made from $Al_2O_3$ was formed by sputtering as shown in FIG. 5(b). To ensure a desirable step coverage, sputtering may be performed by applying a bias to the substrate. As shown in FIG. 5(c), the protective film 22 was coated with a resist, and the entire surface of the resist was irradiated with ultraviolet lines and baked at 150° C. to flatten the surface of the resist 23. As shown in FIG. 5(d), the resist 23 and the protective film 22 were etched at the same etching rate, to expose the surface of the previously formed end portion 21 from the protective film 22 by RIE using $BCl_3$. The surface of the end portion 21 may be of course exposed by polishing such as CMP.

Figure 6:
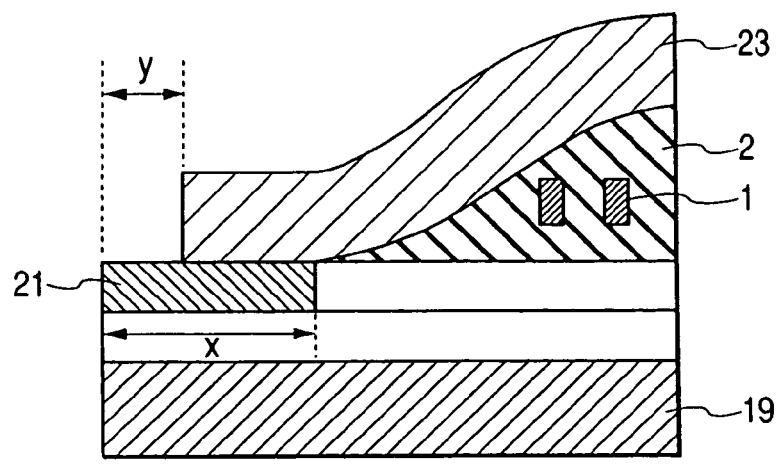
FIG. 6 is a schematic sectional view, on an arbitrarily scale, of the magnetic head according to the embodiment of the present invention.

After a coil and an insulating film were formed, a negative resist (trade name: TSMR-iN010) was applied to a thickness of 8 µm by spin-coating performed at a rotating speed of 1000 rpm. The resist was then subjected to exposure by an i-line stepper and development, to form a frame pattern. Since the frame is made from the negative resist, there does not occur any halation upon formation of the frame. As a result, there was obtained the frame having a side surface upstanding at right angles. Then, a film of NiFe having a saturation magnetic induction flux density (Bs) of 1.0 T was applied, to form a rear portion of an upper magnetic core. Electrode terminals were then formed and the substrate was processed, to obtain a magnetic head. FIG. 6 is a schematic sectional view, on an arbitrarily enlarged scale, showing the magnetic head thus manufactured. It should be noted that in FIG. 6, the reproducing head is omitted. Referring to FIG. 6, the gap depth (x) is set at 3.5 µm, and the distance (y) between the front end of a connection area in which the end portion 21 is connected to the rear portion 23 of the upper magnetic core and the face, opposed to a medium, of the upper magnetic core is set at 0.5 µm. The distance (y) is preferably in a range of 0.2 to 1.5 µm.

FIG. 7 schematically shows the accomplished thin film magnetic head. A magnetic disk apparatus exhibiting an areal recording density of 10 Gbit/in$^2$ was manufactured by using such a thin film magnetic head. The detail about FIG. 7 has been already above-stated.

A magnetic disk apparatus exhibiting an areal recording density of 5 Gbit/in$^2$ or more can be manufactured by using the above-described thin film magnetic head.

What is claimed is:

1. A magnetic head comprising:
   a lower magnetic core including,
   a first magnetic layer,
   an upper magnetic core including:
      a second plated magnetic layer having a first face emerging at a face opposed to a medium; and
      a third plated magnetic layer having a second face not emerging at a face opposed to the medium, which is connecting to said second plated magnetic layer at a position of said second face,
      a gap film formed between said lower magnetic core and said upper magnetic core, wherein,
      the distance between said first face and said second face is 0.2 to 1.5 µm.

2. A magnetic head according to claim 1, wherein said third plated magnetic layer connects to said second plated magnetic layer at a location between the face opposed to the medium and a position defining a gap depth.

3. A magnetic head according to claim 1, wherein a saturation magnetic induction flux density of said third plated magnetic layer is 1.5 T or more.

4. A magnetic head comprising:
a lower magnetic core including a first magnetic layer,
an upper magnetic core including:
   a second plated magnetic layer having a first face emerging at a face opposed to a medium, and
   a third plated magnetic layer having a second face not emerging at a face opposed to the medium, which is connecting to said second plated magnetic layer at a position of said second face,
   a gap film formed between said lower magnetic core and said upper magnetic core, wherein,
   the distance between said first face and said second face is 0.2 to 1.5 μm.

5. A magnetic head according to claim 4, wherein said third plated magnetic layer connects to said second plated magnetic layer at a location between the face opposed to the medium and a position defining a gap depth.

6. A magnetic head according to claim 4, wherein a saturation magnetic induction flux density of said third plated magnetic layer is 1.5 T or more.

7. A manufacturing method of a thin film magnetic head comprising:
forming a lower magnetic core,
forming a gap layer,
forming an end portion of an upper magnetic core above the gap layer,
forming a protective film above the lower magnetic core
forming a coil and an insulator above the protective film,
forming a frame by a negative resist formed on the end portion of an upper magnetic core and the insulator, and
forming a rear portion of the upper magnetic core by using the frame, and,
wherein the end portion of the upper magnetic core has a face opposed to a medium.

8. A manufacturing method of a thin film magnetic head according to claim 7 further comprising:
forming a lower magnetic core before forming the gap layer.

9. A manufacturing method of a thin film magnetic head according to claim 7, wherein a saturation magnetic induction flux density of the end portion of the upper magnetic core is bigger than that of the rear portion of the upper magnetic core.

10. A manufacturing method of a thin film magnetic head according to claim 7 further comprising:
covering the gap layer and the end portion of the upper magnetic core with a material of a protective film after forming the end portion of the upper magnetic core,
polishing the material of a protective film to expose the surface of the end portion of the upper magnetic core.

11. A manufacturing method of a thin film magnetic head according to claim 7, wherein the rear portion of the upper magnetic core and the end portion of the upper magnetic core are connected above a face of the gap layer and an end position of the gap layer defining a gap depth.

12. A magnetic head comprising:
a lower magnetic core,
a gap layer formed above the lower magnetic core,
an end portion of an upper magnetic core formed above the gap layer, and having a face opposed to a medium,
a protective film formed above the lower magnetic core, and next to the end portion of the upper magnetic core,
a coil and an insulator formed above the protective film, and
a rear portion of the upper magnetic core formed on the end portion of the upper magnetic core and the insulator,
wherein the coil and the insulator are formed above the end portion of the upper magnetic core, and
the rear portion of the upper magnetic core is formed by using a negative resist frame.

13. A magnetic head according to claim 12, wherein a distance between a face of the end portion of the upper magnetic core and a face of the rear portion of the upper magnetic core is 0.2–1.5 μm.

14. A magnetic head according to claim 12, wherein a saturation magnetic induction flux density of the end portion of the upper magnetic core is bigger than that of the rear portion of the upper magnetic core.

15. A magnetic head according to claim 12, wherein a material of the end portion of the upper magnetic core is different from that of the rear portion of the upper magnetic core.

16. A magnetic head according to claim 12, wherein surfaces of the end portion of the upper magnetic core and the protective film are formed by CMP.

17. A magnetic head according to claim 12, wherein the rear portion of the upper magnetic core and the end portion of the upper magnetic core are connected above a face of the gap layer and an end position of the gap layer defining a gap depth.

18. A manufacturing method of a magnetic head comprising:
forming a lower magnetic core,
forming a gap layer above the lower magnetic core,
forming an end portion of an upper magnetic core above the gap layer,
forming a protective film above the end portion to cover the end portion,
polishing the protective film by CMP to expose a surface of the end portion and smooth the surface of the protective film,
forming a coil and an insulator above the protective film,
depositing a negative resist above the end portion and the insulator,
forming a frame which extends past the expected location of an air bearing surface (ABS) by exposing and developing the negative resist,
forming a rear portion of the upper magnetic core by plating above the insulator and a part of the end portion using the frame formed by exposing and developing the negative resist as a mask, and
removing the negative resist forming the frame to result in the rear portion being recessed from the expected ABS.

19. A manufacturing method of a magnetic head according to claim 18,
wherein the protective film comprises $Al_2O_3$.

20. A manufacturing method of a magnetic head according to claim 18,
wherein the protective film is formed between the coil and the gap layer, and touches on an opposite surface against an expected ABS side surface of the end portion.

21. A manufacturing method of a magnetic head according to claim 18,
wherein a distance between a face of the end portion and the face of the rear portion is 0.2–1.5 μm.

22. A manufacturing method of a magnetic head comprising:
   forming a lower magnetic core,
   forming a gap layer above the lower magnetic core,
   forming an end portion of an upper magnetic core above the gap layer,
   depositing an $SiO_2$ or $Al_2O_3$ film above the end portion after forming the end portion of the upper magnetic coil,
   polishing the $SiO_2$ or $Al_2O_3$ film by CMP to expose a surface of the end portion,
   forming a coil and an insulator above the $SiO_2$ or $Al_2O_3$ film,
   depositing a negative resist over the end portion and the insulator after forming said coil,
   forming a frame which extends past the expected location of an air bearing surface (ABS) by exposing and developing the negative resist,
   forming a rear portion of the upper magnetic core by plating above the insulator and a part of the end portion using the frame formed by exposing and developing the negative resist as a mask, and
   removing the negative resist forming the frame to result in the rear portion being recessed from the expected ABS,
   wherein a face of the rear portion is apart from a face of the end portion,
   wherein the $SiO_2$ or $Al_2O_3$ film formed above the end portion is removed by the CMP.

23. A manufacturing method of a magnetic head according to claim 22,
   wherein the end portion is formed between an ABS and the $SiO_2$ or $Al_2O_3$ film,
   a level of the surface of the end portion is as same as that of the $SiO_2$ or $Al_2O_3$ film.

24. A manufacturing method of a magnetic head according to claim 22,
   wherein a distance between a face of the end portion and the face of the rear portion is smaller than a gap depth.

25. A manufacturing method of a magnetic head according to claim 22,
   further comprising forming a reproducing head having an upper magnetic shield, and a lower magnetic shield, a magneto-resistive element formed between the upper magnetic shield and the lower magnetic shield,
   wherein the upper magnetic shield serves as the lower magnetic core.

* * * * *

UNITED STATES PATENT AND TRADEMARK OFFICE
Certificate

Patent No. 7,068,467 B2                                                                                              Patented: June 27, 2006

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tomohiro Okada, Hitachi (JP); Tetsuya Okai, Odawara (JP); Shinobu Sasaki, Odawara (JP); Tadayuki Iwakura, Odawara (JP); Naoki Koyama, Nakano-ku (JP); Harunobu Saito, Chigasaki (JP); Makoto Morijiri, Naka-gun (JP); and Takashi Kawabe, Hitachi (JP).

Signed and Sealed this Twenty-fourth Day of June 2008.

HOA T. NGUYEN
*Supervisory Patent Examiner*
Art Unit 2627

UNITED STATES PATENT AND TRADEMARK OFFICE
CERTIFICATE OF CORRECTION

PATENT NO.        : 7,068,467 B2
APPLICATION NO.   : 10/933451
DATED             : June 27, 2006
INVENTOR(S)       : Tomohiro Okada et al.

It is certified that error appears in the above-identified patent and that said Letters Patent is hereby corrected as shown below:

<u>In the Title Page:</u>  After the fifth named inventor, i.e., after "Koyama, Nakano-ku (JP);" insert:

-- Takashi KAWABE, Hitachi-shi (JP); --

Signed and Sealed this

Fourth Day of November, 2008

JON W. DUDAS
*Director of the United States Patent and Trademark Office*